INVENTOR
HILMAR SCHONEMEYER

BY [signature]
ATTORNEY

INVENTOR
HILMAR SCHONEMEYER
BY J Warren Whitesel
ATTORNEY

INVENTOR
HILMAR SCHONEMEYER
BY [signature]
ATTORNEY

INVENTOR
HILMAR SCHONEMEYER
BY [signature]
ATTORNEY

United States Patent Office 3,310,633
Patented Mar. 21, 1967

3,310,633
ARRANGEMENT FOR SELECTING TRANSMISSION PATHS IN MULTI-STAGE SWITCHING GRIDS

Hilmar Schonemeyer, Ditzingen, Wurttemberg, Germany, assignor to International Standard Electric Corporation, a corporation of Delaware Filed Aug. 6, 1963, Ser. No. 300,237
Claims priority, application Germany, Aug. 23, 1962, St 19,627
8 Claims. (Cl. 179—18)

This invention relates to switching systems and more particularly to circuits for selecting paths through such systems.

Recently much emphasis has been placed upon developing switching systems which depend upon the ability of self-seeking paths to find their own way from one end-marked point through a network to another end-marked point. The end-marking on the originating side of a network is herein called an "offering signal," and the marking on the opposite side is called a "catching signal."

One example of end-marked networks using this described type of signals is found in German Patent No. 1,115,777. There an offering (or routing) signal is applied to one input for marking guide wires leading to all idle outlets which are accessible from this input. A catching (selection identification) signal is applied to one of these idle outlets. Then in a step-by-step manner, this catching signal is retransmitted through the network via a guide wire which follows an idle path. In the course of this retransmission, the idle connecting devices or switching points are operated. The catching signal actuates a block connecting relay for connecting the switch block to a marker which is common to each switching stage. Upon reception of the catching signal, this marker selects one of the guide wires conducting the offering signal. Then the marker transfers the catching signal and simultaneously sets the associated crosspoints lying within the switching network.

This prior art arrangement has the disadvantage that it always requires common equipment which has to carry out a hunting process. The switching operation requires a certain minimum time which has to be kept short to minimize the time of holding the central equipment.

Accordingly, an object of the invention is to provide new and improved path selection circuits. More particularly, an object is to provide for path selection in a guide wire switching system.

A further object is to provide for path selection in end-marked networks which have conventional switching devices at crosspoints. In this connection, an object is to provide for extending self-seeking paths through electromechanical networks. Here an object is to extend self-seeking paths over guide wires and then to operate crosspoints associated with such guide wires.

The present invention provides for the selection of a transmission path in a multi-stage switching network. An identification signal (offering signal) is appled to one or more points on one side of the switching grid for marking all of the idle points which are accessible on the other side of the switching grid. Another identification signal (catching signal) is applied to one of these accessible idle points. In a step-by-step manner, a signal returns from the point marked by the catching signal in the backward direction for selecting an idle path through the switching network. According to one aspect of the invention, the catching signal is retransmitted in parallel to the switch blocks of the preceding stage via all of the idle intermediate lines. This retransmitted signal can only become effective in those of the switch blocks to which the offering signal is also applied. A self-selecting circuit prevents the catching signal from being transferred to more than one block of each stage. Simultaneously with the transfer of the catching signal to the preceding stage, a switching means identifies the selected switching block to complete a desired path.

The above mentioned and other features of this invention and the manner of obtaining them will become more apparent, and the invention itself will be best understood by reference to the following description of an embodiment of the invention taken in conjunction with the accompanying drawings, in which.

Figure 1:
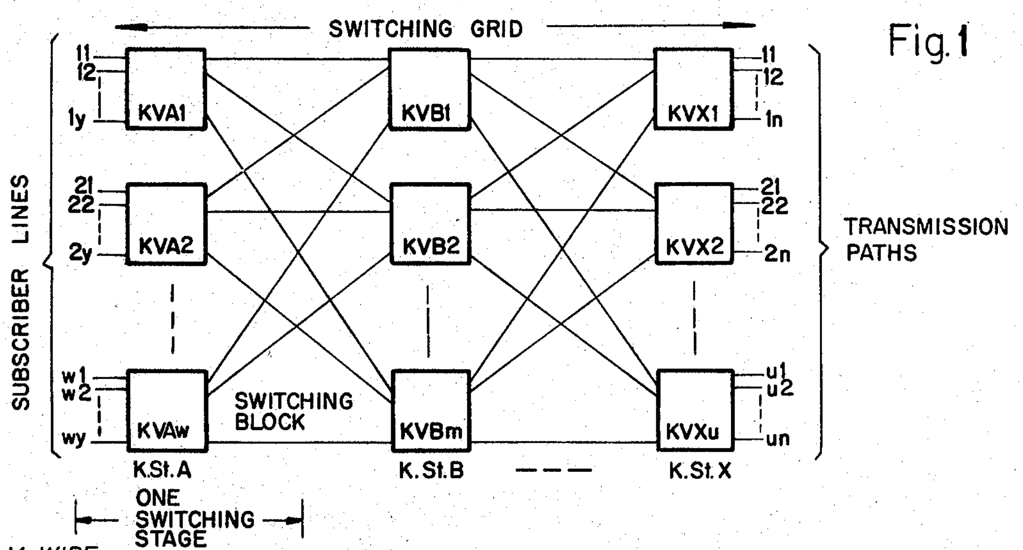
FIG. 1 is a block diagram which shows the basic circuit of a switching network comprising $x$ number of stages (here an exemplary three stages are shown)

In the switching grid of FIG. 1, subscriber lines are connected to the inputs 11 . . . *wy* of the switch blocks KVA1 . . . *w* of the switching stage K.S*t*.A. The transmission paths are connected to the outputs 11 . . . *un* of the switch blocks KVX1 . . . *u* of the switching stage K.S*t*.X. The individual stages can be randomly connected together in any suitable composition. However, between each switch block of neighboring stages, only one single intermediate line is provided. This line represents, in parallel relation, the speech-, hold counting and guide wires. If the guide wire network is of the two-wire type, one of these wires is called an "*m*-wire," and the other wire is called a "*k*-wire." An offering signal is transmitted from the lefthand edge of the switching grid in a fan-shaped fashion via all idle and accessible *m*-wires to the other side of the switching grid. On the second guide wire ("*k*-wire") the catching signal is transmitted in the opposite direction, with a selection being performed in each stage. That is, each time that the *k*-wire signal passes through a stage only one switch block is activated. In this way, a route is selected from among the offered "fan."

Figure 1A:
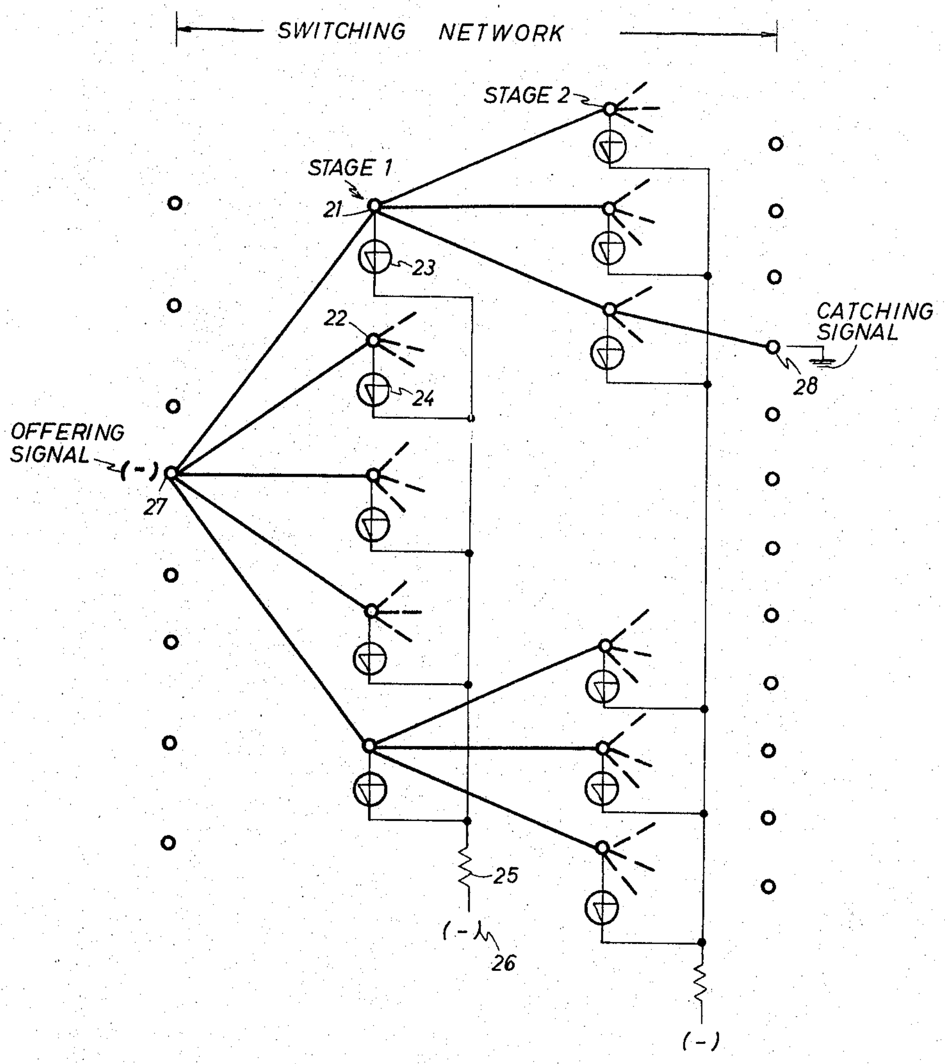
FIG. 1A is a simplified diagram showing how one path selects itself from among other paths which have been extended through the network in a fan-out pattern.

Briefly, reference may be made to FIG. 1A for a showing of this "fan" and an explanation of the general principles of the invention. This drawing shows a switching network 20 having a plurality of cascaded switching stages, an exemplary two of which are here designated "Stage 1" and "Stage 2." Each stage includes a number of parallel connected electromechanical switching devices, each shown by a small circle. For example, switching devices 21 and 22 are parallel to each other insofar as paths through the network are concerned. All of the electromechanical devices are connected together as shown in FIG. 1 to provide a complete network.

A number of electronic switch means are individually associated with the electromechanical switching devices of each stage. Thus, for example, the electronic switch means 23, 24 are individual to the electromechanical devices 21, 22 respectfully. In like manner, every other electromechanical device also has an individually associated electronic switch means. All of the electronic switch means associated with any one stage are connected in parallel (as via a resistor 25) to a common potential 26.

In this exemplary network, each electronic device is a pnpn diode which switches "on" or fires if a sufficient potential difference is applied across its terminals. In theory, every diode is identical to every other diode and all will fire simultaneously if a firing potential is applied to all simultaneously. In practice, this would almost never occur. Almost certainly, one diode fires before any other. When it does so fire, it eliminates the possibility that any other diode will fire because the upper end of resistor 25 will become less negative.

The network operates this way. An offering signal [here (−) battery] is applied to a desired one of many end points, such as 27, for example. Responsive thereto, offering signals are extended from end-marked point 27 over a fan-out pattern of idle switching devices via guide wires extending toward the right-hand side of the network. One such pattern is shown by heavily inked lines in FIG. 1A. On the right-hand side of the network, any suitable equipment (such as an allotter) applies a catching signal at a desired end-marked point 28. Wherever the catching signal coincides in the network with an offering signal at an idle switching device, there is an AND function. This causes an AND circuit to fire one of the electronic switches. When it fires, the electronic switch selects one particular electromechanical device and prevents the selection of any other such device in that stage. In this manner a self-seeking path finds its way back over the guide wires to the left-hand side of the network. Upon completion of a guide wire path the selected electromechanical devices operate to complete a desired connection.

Figure 2:
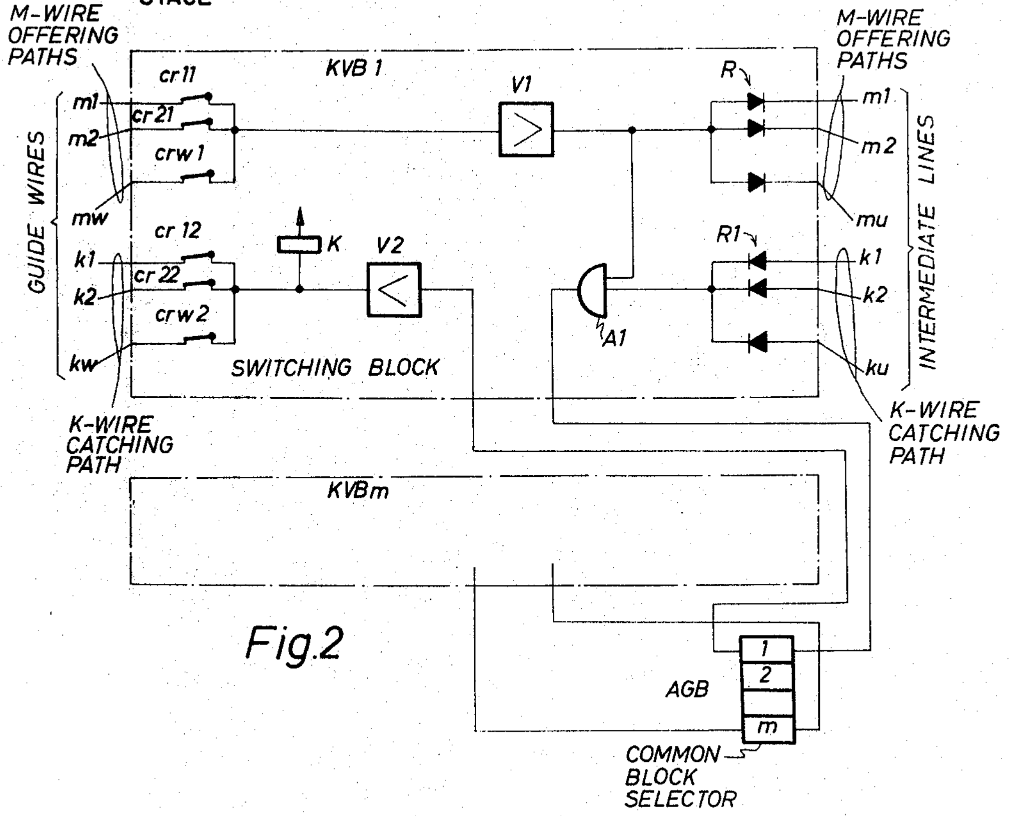
FIG. 2 shows a diagram relating to a switch block comprising a two-wire guide network.

All switching points on blocks of the individual stages are designed in the same way. Thus the guide wire network of only one block is shown in detail. For this detailed showing reference is made to the diagram of FIG. 2.

In the offering signal is received via the guide wire *mw*, for example, the signal is amplified by the amplifier V1 and transferred to all of the intermediate lines *m*1 . . . *u*. The rectifiers R are coupled in series with these wires to decouple the intermediate lines from one another. The offering signal received on guide wire *mw* is sent to all of the intermediate lines whether they are or are not busy.

In the next switching stage, a seizing contact from among the contacts cell, *cr*12 . . . opens or closes depending upon whether the offering signal is to be transferred to the following stage. The contact *cr* is open in each busy intermediate stage to prevent the offering signal from being transferred forward.

After the offering signal passes through the entire switching network, the catching signal is applied to a guide wire *k*1, *k*2 . . . *ku* at one of the transmission paths marked by the offering signal. The exact manner in which a *k*-wire is selected is not important—an allotter could have made the selection. The signal returns via the decoupling rectifiers R1 connected in series with the *k*-wires. In each stage, the catching signal is supplied to an AND circuit A1 which permits the passage thereof only if the offering signal is also applied thereto. Now the catching signal is applied from AND circuit A1 to a selecting element AGB which is common to all switch blocks of one stage. This selecting element AGB allows only one block of the stage to retransmit the catching signal. The catching signal is conducted from element AGB via the amplifier V2 to the *k* guide wires of all idle intermediate lines in the next preceding stage. The transfer of the catching signal is prevented in the busy intermediate lines by the action of the contacts *cr*12 . . . *crw*2.

Together with the transfer of the catching signal to the switch blocks of the preceding stage, a relay K is operated to identify the selected switch block. This relay then serves to control the connecting through of the corresponding intermediate lines.

The AND circuit A1 lets the catching signal become effective only if an offering signal also exists in the switch block. Since the catching signal is retransmitted back through the switch blocks via all of the idle intermediate lines, in parallel, the catching signal may reach busy switch blocks in which the offering signal is not present.

Figure 3:
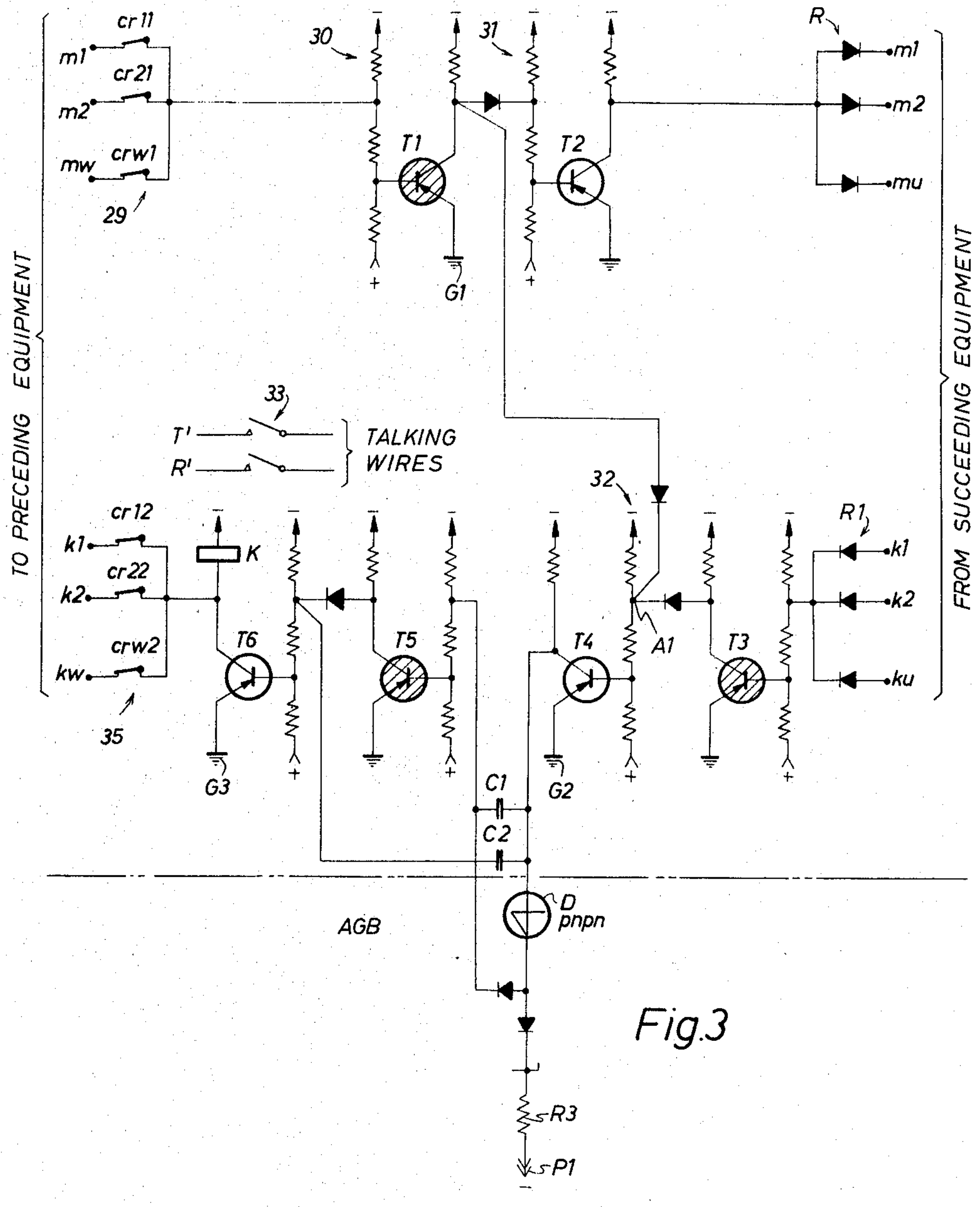
FIG. 3 is a schematic circuit diagram which shows an example of an amplifier and selector circuit for use in the two guide wire network of FIG. 2.

In the normal condition, the transistors T1, T3, T5 (FIG. 3) are conductive in one switch block. A ground potential is applied as an offering signal to one or more of the *m*-wires 29. This potential energizes the voltage divider 30, and the transistor T1 switches "off" and becomes blocked. Because of this, the potential at the voltage divider 31 of the transistor T2 is changed in a way such that it switches "on." This transfers a ground potential via the rectifiers R and the associated *m* wires to the next switch blocks. The blocking of transistor T1 has no effect upon the transistor T4 which is and remains blocked due to the conductive transistor T3.

If a ground potential catching signal is applied to a *k* wire from among *k*1, *k*2 . . . *ku*, the transistor T3 switches "off" and becomes blocked. Because of this, the transistor T4 can become conductive if the ground potential G1 is removed from the voltage divider 32 by the blocked transistor T1.

Means are provided for selecting one path among the many which are marked by the catching signal that is returning over the *k*-wires. In greater detail, when the transistor T4 switches "on," the ground potential G2, acting through the transistor T4, is applied to a pnpn type of diode D. All of the pnpn diodes of one switching stage are connected in parallel to a negative potential P1 via a common series resistance R3. As soon as any one of the pnpn diodes becomes conductive, it applies ground potential to the common resistor R3 and thus blocks all of the other pnpn diodes. This means that the common equipment AGB has self-selected one among many paths.

The transistor T4 blocks the transistor T5 by extending the potential G2 via the conducting pnpn diode. Because of this, the transistor T6 becomes conductive and applies the ground potential G3 as a catching signal to the *k* wires 35 extending to the preceding switch blocks. At the same time, the relay K is operated for controlling the connecting through of the corresponding crosspoints. That is, talking conductors T′, R′ are extended through crosspoint contacts 33 controlled by relay K.

During the selection time, the pnpn diodes D may not be loaded. For this reason, the transistor T5 is blocked via the capacitor C1. At the same time the transistor T6 is blocked via the capacitor C2. The time constant of the circuit C1 is smaller than that of the circuit C2.

Means are provided for blocking the transmission of a catching signal through any switching block that is busy. For example, suppose that the catching signal is received in a busy switching block via a *k* wire. If the switching block is busy, the transistor T3 is blocked because it previously received a ground catching signal via another *k* wire. As there is no offering signal, this has no further effect. That is, when the transistor T1 is conductive (no offering signal is present), a ground potential G1 is applied to the voltage divider 32. This prevents the transistor T4 from becoming conductive.

Figure 4:
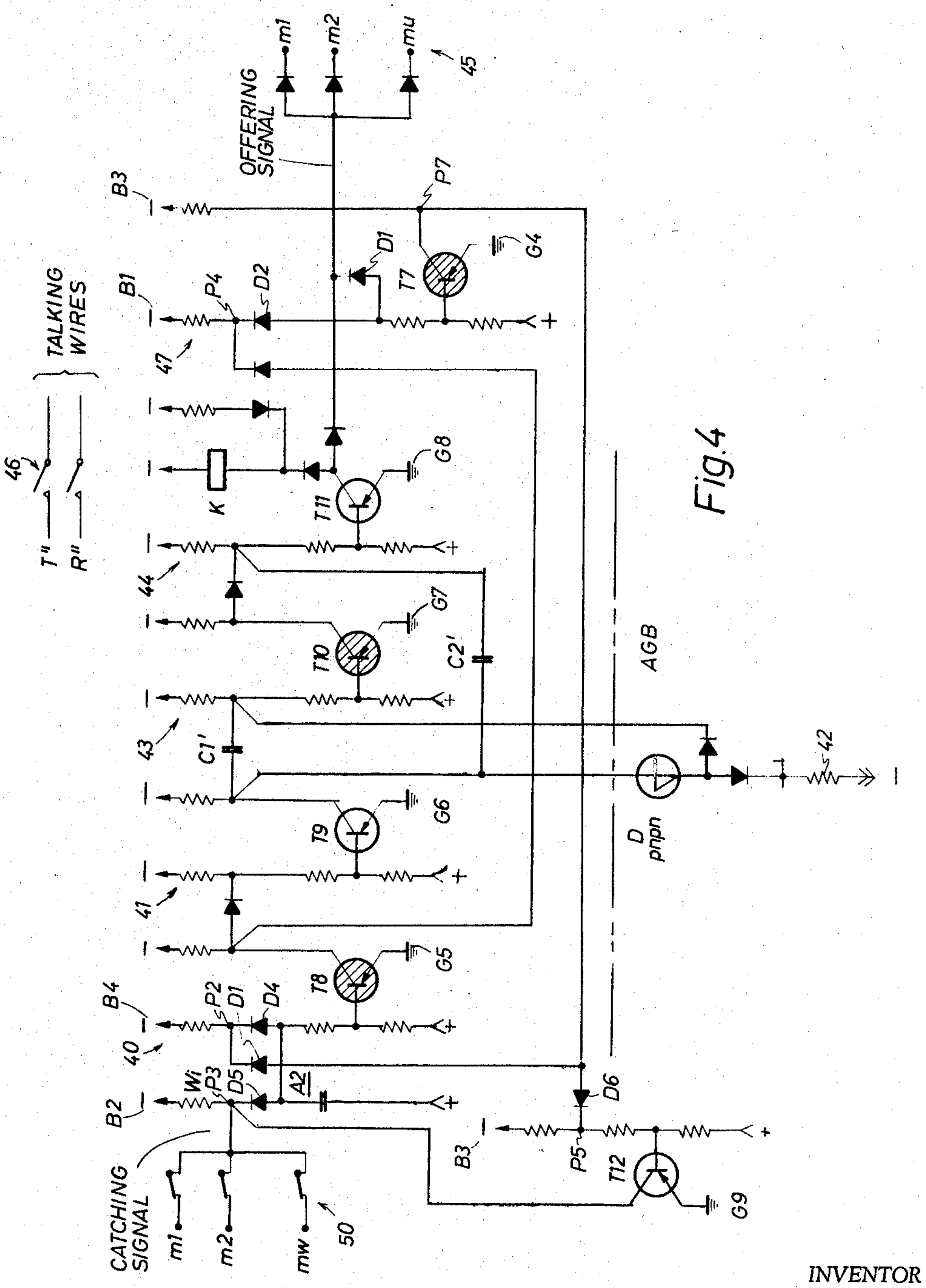
FIG. 4 shows an alternative embodiment relating to an amplifier and selector circuit for a one guide wire network.

Up to now there has only been described a two-wire type of guide network. Now an embodiment of the amplifier will be described for use in a switching block which requires only a single-wire guide conductor. In this arrangement, the offering signal is applied from the right-hand side (FIG. 4). The catching signal comes from the left-hand side. Normally, the point P4 is at the potential of ground G5.

If the offering signal is applied to one of the guide wires, e.g. *mu*, a negative potential appears via diode D1 at the base of transistor T7 which becomes conductive. In this state, the transistors T8 and T10 are also unblocked, whereas all of the remaining transistors are blocked. The negative offering signal (battery B2 potential) is now transferred via the resistor W*i* to the switching blocks of the preceding stages.

In greater detail, the AND circuit A2 functions to prevent a catching signal from operating a busy switching block. A busy block is characterized by an absence of an offering signal at 45; an idle block is characterized by the presence of such a signal. Normally, transistors, T8, T12 are conducting. Ground potential G5 appears at point P4 and ground potential G9 appears at point P3. Transistor T7 is "off."

First, assume that a negative offering signal is received at 45. Diode D1 conducts; diode D2 is back biased. The negative offering signal makes the base of transistor T7 negative relative to its emitter. The transistor T7 switches "on"; ground potential G4 appears at points P2, P5. The transistor T12 switches "off" and ground is removed from point P3. Thus, the negative battery B2 is applied as an offering signal over wires 50 to preceding circuits. The appearance of ground potential G4 at point P2 back biases the diode D4 without effect because the negative potential of battery B2 feeds through resistor *Wi*, point P3, and diode D5 to hold transistor T8 "on."

The preceding circuit returns a catching signal in the form of a ground potential over one of the wires shown at 50. This back biases the diode D5. Now both of the diodes D4 and D5 are back biased to complete an AND function. The base of the transistor T8 goes positive relative to its emitter, and it switches "off." When the transistor T8 switches "off," ground G5 is removed from the voltage divider 41. The transistor T9 is unblocked, switches "on," and applies the ground potential G6 to the pnpn diode D in the manner already described. Again, the pnpn diodes of all switching blocks of one stage are connected in parallel to a common negative potential applied via one common resistor 42. Only one of these pnpn diodes can become conductive. It fires and applies the ground potential G6 to the voltage divider 43 of the transistor T10 which switches "off" and is blocked. This removes ground G7 from voltage divider 44 and causes the transistor T11 to become unblocked. The capacitors C1′ and C2′ affect the last mentioned switching operations in the manner already described.

The transistor T11, which now conducts, applies the ground potential G8 to the *m* guide wires 45 extending to the switching blocks of the next stage and simultaneously operates the relay K. This relay K identifies the selected switching block and causes the connecting-through of the talking conductors at the corresponding crosspoints 46.

The blocking of the transistor T8 caused the ground potential G5 to be removed from point P4 on the voltage divider 47 of the transistor T7. Thus, transistor T7 remains conductive because its base is made negative by battery B1.

Next, assume that the FIG. 4 circuit is busy so that the offering signal is not sent in over a wire 45. No negative potential passes through diode D1; the ground at point P4 back biased the diode D2; transistor T7 is and remains "off." Battery B3—not ground G4 appears at point P7. Diode D6 is back biased. Thus, the transistor T12 remains "on," and the ground potential G9 remains at point P3. No offering signal is returned over wires 50. Diodes D5, D7 are back biased. Thus, the negative potential of battery B4 reaches the base of transistor T8. Transistor T8 does not switch "off" and the above described functions can not occur if a catching signal is returned over one of the *m*-wires at 50.

It is possible that all outputs, e.g. the connection sets lying on the one (right-hand) side of the switching network, permanently indicate their readiness for being seized. In other words, the circuits continuously transmit the offering signals, even when no marking process is taking place. Accordingly, the offering signal is applied to all inputs. If a marking is required, a positive potential is applied as the catching signal, and one block is selected in each stage. By providing a corresponding arrangement, each switching block may be safeguarded by limiting the transmission of the offering signals. If a preselection is performed, no preparatory offering signal exists in the normal condition. It is only applied during the marking process.

While the principles of the invention have been described above in connection with specific apparatus and applications, it is to be understood that this description is made only by way of example and not as a limitation on the scope of the invention.

I claim:

1. A guide wire switching system comprising a plurality of cascaded switching stages, each stage including a number of switching blocks incorporating switching points, means comprising a plurality of guide wires for controlling the operation of the switching points in said system, means responsive to an application of an offering signal to said guide wires on one side of said system for transmitting a fan-out of signals over a plurality of said guide wires and through said switching points toward the opposite side of said system, means for receiving a catching signal on a guide wire on the opposite side of said system, selecting means including AND function circuits responsive to the simultaneous presence of a fan-out signal and the catching signal at a switching point for selecting a path through the associated switching block, said selecting means including means whereby said catching signal is returned over parallel paths via said guide wires, and said selecting means including means at each of said stages for selecting a single one of the switching blocks in that stage to return the catching signal to the next preceding stage.

2. The system of claim 1 wherein said selecting means comprises a plurality of pnpn diodes, means for connecting one of said diodes from each switching block in a stage to a common potential, means responsive to said catching signal for applying a firing potential to all of said parallel pnpn diodes whereby one of said diodes fires first to select a given one of said switching blocks, and means responsive to the firing of said one diode for preventing any other of said diodes from firing.

3. The system of claim 1 and means for permanently applying said offering signal to all idle ones of said switching blocks.

4. The system of claim 1 and means whereby both said offering and said catching signals are transmitted over a single wire, said two signals being characterized by different potentials.

5. The system of claim 1 and means comprising a two input AND circuit in each of said switching blocks, means for energizing one input of said AND circuits by an offering signal and the other input of said AND circuits by a catching signal, and means responsive to the output of said AND circuit for enabling the extension of a path through said switching block.

6. The system of claim 1 and time delay means for preventing said catching signal from being returned after said selection has occurred.

7. The system of claim 1, there being two of said guide wires through each of said switching blocks and means for transmitting said offering signals over one of said guide wires and said catching signals over the other of said guide wires.

8. The switching system of claim 1 within said selecting means comprises a plurality of parallel connecting electronic switching devices having similar characteristics which vary within manufacturing tolerance limits, means responsive to said returning signal for marking all of said parallel connected devices with a switching signal whereby one of said devices switches first owing to said variations of said manufacturing tolerances, and means responsive to the switching of said first switched device for precluding the switching of other of said devices.

References Cited by the Examiner

UNITED STATES PATENTS

| | | | |
|---|---|---|---|
| 2,925,471 | 2/1960 | Licht | 179—18.7 |
| 2,993,093 | 7/1961 | Gerke et al. | 179—18.7 |
| 3,184,552 | 5/1965 | Macrander | 179—18.7 |

KATHLEEN H. CLAFFY, *Primary Examiner.*

L. A. WRIGHT, *Assistant Examiner.*